United States Patent
Asanuma et al.

(10) Patent No.: US 11,845,865 B2
(45) Date of Patent: Dec. 19, 2023

(54) THERMOPLASTIC RESIN FILM

(71) Applicant: Furukawa Electric Co., Ltd., Tokyo (JP)

(72) Inventors: Takumi Asanuma, Tokyo (JP); Hideyuki Ikeda, Tokyo (JP); Shota Sugiyama, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 551 days.

(21) Appl. No.: 17/095,679

(22) Filed: Nov. 11, 2020

(65) Prior Publication Data
US 2021/0061998 A1    Mar. 4, 2021

Related U.S. Application Data

(63) Continuation of application No. PCT/JP2020/012177, filed on Mar. 19, 2020.

(30) Foreign Application Priority Data

Mar. 29, 2019 (JP) ................................ 2019-067583

(51) Int. Cl.
C08L 81/06 (2006.01)
C08L 71/02 (2006.01)

(52) U.S. Cl.
CPC ............... *C08L 81/06* (2013.01); *C08L 71/02* (2013.01)

(58) Field of Classification Search
CPC ....... C08L 71/08; C08L 61/18; C08L 2201/10
See application file for complete search history.

(56) References Cited

U.S. PATENT DOCUMENTS

| | | | | |
|---|---|---|---|---|
| 4,640,961 A | * | 2/1987 | Saito | C08L 67/00 524/539 |
| 4,910,083 A | * | 3/1990 | Kohn | C08J 5/18 524/464 |
| 5,260,104 A | * | 11/1993 | Bryant | H01B 13/065 427/386 |
| 2006/0247343 A1 | | 11/2006 | Kishimoto et al. | |
| 2012/0037410 A1 | | 2/2012 | Amou et al. | |
| 2015/0140306 A1 | | 5/2015 | Endo et al. | |
| 2017/0198182 A1 | | 7/2017 | Kim et al. | |
| 2017/0233610 A1 | | 8/2017 | Kim et al. | |

FOREIGN PATENT DOCUMENTS

| | | | |
|---|---|---|---|
| CN | 1761721 A | 4/2006 | |
| CN | 102382382 A | 3/2012 | |
| CN | 106459719 A | 2/2017 | |
| CN | 107254057 A | 10/2017 | |
| EP | 170067 A | * 2/1986 | ............. C08L 67/00 |
| JP | 2002321285 A | 11/2002 | |
| JP | 2007084595 A | 4/2007 | |
| JP | 2008266418 A | 11/2008 | |
| JP | 2009079119 A | 4/2009 | |
| JP | 2010126709 A | 6/2010 | |
| JP | 2011021097 4 | 2/2011 | |
| JP | 2017110063 A | 6/2017 | |

OTHER PUBLICATIONS

Xi et al (Journal of Macromolecular Science, Part B: Physics, 51:510-524, 2012). (Year: 2012).*
Grasmeder. Polymer Crystallinity—HPP Explained (part 3)—Victrex. https://www.victrex.com/en/blog/2017/polymer-crystallinity-hpp-explained-part-3#:~:text=The%20influence%20of%20temperature%20control,is%20typically%20about%2035%25%20crystalline (Year: 2017).*
International Search Report and Written Opinion received in PCT/JP2020/012177 dated Jun. 16, 2020 (Engl. translation of ISR only).
[English Translation] First Office Action dated Nov. 30, 2021 for Chinese Patent Application No. 202080002554.9.
[English Translation] First Office Action dated Dec. 28, 2021 for Taiwanese Patent Application No. 109110485.
[English Translation] Notice of Reasons for Refusal dated Nov. 29, 2021 for Japanese Patent Application No. 2019-067583.
English translation of Office Action for KR Application No. 10-2020-7037062, dated Apr. 12, 2021.
Ryou, Jin H. et al., "Thermal Stability and Dynamic Viscoelasticity of Poly(Ether Ether Ketone) Polyarylate Blends", Polymer (Korea), vol. 18, No. 6, Aug. 1994, pp. 957-965.
Wu, Zhongwen et al., "Molecular Aggregation of Peek With PES Blends and the Block Copolymers Composed of Peek and PES Components", Macromolecular Materials and Engineering, vol. 173, No. 1, Dec. 1989, pp. 163-181.
[English Translation] Notice of Final Rejection for Korean Application No. 10-2020-7037062, dated Aug. 19, 2021.
English translation of International Preliminary Report on Patentability for Application No. PCT/JP2020/012177, dated Sep. 28, 2021.
English translation of Written Opinion for Application No. PCT/JP2020/012177, dated Jun. 16, 2020.

* cited by examiner

*Primary Examiner* — Michael M Dollinger
(74) *Attorney, Agent, or Firm* — Dorsey & Whitney LLP

(57) ABSTRACT

The present disclosure provides a base film for an adhesive tape used in a manufacturing process of a semiconductor that can be used in a plurality of processes including a reflow process.
A thermoplastic resin film, which is a resin composite of a first resin component that is a crystalline thermoplastic resin having a melting point of 290° C. or higher and a second resin component that has a glass transition temperature of 150° C. or higher, wherein the crystallinity of the first resin component is more than 5.0% of the entire resin composite.

14 Claims, No Drawings

THERMOPLASTIC RESIN FILM

CROSS REFERENCE TO RELATED APPLICATIONS

The present application is a continuation application of International Patent Application No. PCI/JP2020/012177 filed on Mar. 19, 2020, which claims the benefit of Japanese Patent Application No, 2019-067583, filed on Mar. 29, 2019, The contents of these applications are incorporated herein by reference in their entirety.

BACKGROUND

Technical Field

The present disclosure relates to a base film for an adhesive tape, on which an adhesive layer is applied, for use in a process of manufacturing semiconductors and which can be used for a plurality of processes including a reflow process.

Background

A polyether ether ketone resin, which is a crystalline thermoplastic resin, has excellent heat resistance, rigidity and the like, and is therefore used in electronic components such as substrates for printed circuit boards, carrier tapes for electronic components, and semi-conductive belts for an image-forming device. For example, it has been proposed that a heat-resistant film composed of a resin composition containing a polyether ether ketone and a polyether sulfone as resin components can be used in a semi-conductive belt of an image-forming device to make a semi-conductive belt having not only heat resistance but also excellent bending fatigue resistance (Japanese Patent Application Laid-Open No. 2008-266418).

On the other hand, before dicing a semiconductor wafer, a back grinding process is performed to reduce the thickness of the semiconductor wafer, and the semiconductor wafer is protected from the grinding by a tape for a process of manufacturing semiconductors. In addition, when picking up a semiconductor chip obtained by dicing a semiconductor wafer, an expanding process is usually performed to expand a tape for a semiconductor manufacturing process before the picking up in order to increase the distance between the semiconductor chips. Furthermore, when picking up a semi-conductor chip, the adhesive layer applied to the tape for the process of manufacturing semiconductors is cured by UV light to reduce the adhesiveness of the adhesive layer. Based on these processes, many of the tapes for the process of manufacturing semiconductors that have been conventionally used in the process of manufacturing semiconductors have been made of a polyolefin/polyester-based resin as the base film, which has excellent elongation characteristics under tension, permeability to UV light, scratch resistance and the like.

On the other hand, in recent years, semiconductor devices have been becoming multi-chip, and a reflow process of heat-treating a workpiece with heat of about 260° C. may be introduced into the manufacturing process. However, the above-mentioned polyolefin/polyester-based resin does not have heat resistance to withstand the reflow process. Therefore, in order to cope with the reflow process, a tape for a process of manufacturing semiconductors using polyimide which has heat resistance as a base film has been introduced. However, the polyimide film is not excellent in elongation characteristics under tension, permeability to UV light, scratch resistance, water absorption rate or the like, and cannot be applied to processes other than the reflow process in the process of manufacturing semiconductors.

Therefore, in the process of manufacturing semiconductors, the tape for the process of manufacturing semiconductors needs to be replaced between the reflow process and processes other than the reflow process, such as the back grinding process, dicing process and pickup process. The replacement of the tape for the process of manufacturing semiconductors leads to increased man-hours and complexity in the process of manufacturing semiconductors, leading to a decreased manufacturing yield of semiconductor devices. Therefore in manufacturing a semiconductor device that requires the introduction of a reflow process, the manufacturing cost increases.

SUMMARY

The present disclosure is related to providing a base film for an adhesive tape used in a process of manufacturing semiconductors that can be used in a plurality of processes including a reflow process.

The gist of the constitution of the present disclosure is as follows.

[1] A thermoplastic resin film, which is a resin composite of a first resin component that is a crystalline thermoplastic resin having a melting point of 290° C. or higher and a second resin component that has a glass transition temperature of 150° C. or higher, wherein the crystallinity of the first resin component is more than 5.0% of the entire resin composite.

[2] The thermoplastic resin film according to [1], wherein the first resin component comprises at least one resin selected from the group consisting of a polyether ether ketone, a polyether ketone, a polyether ketone ketone, a polyether ether ketone ketone and an aliphatic polyketone.

[3] The thermoplastic resin film ding to [1] or [2], wherein the second resin component comprises an aromatic polyester resin.

[4] The thermoplastic resin film according to [1] or [2], wherein the second resin component comprises an amorphous thermoplastic resin having an ether bond.

[5] The thermoplastic resin film according to any one of [1] to [4], wherein the resin composite is composed of a matrix part comprising the first resin component and a domain part comprising the second resin component dispersedly contained in the matrix part.

[6] The thermoplastic resin film according to [5], wherein an average diameter of the domain part in a cut surface in a direction orthogonal to a flow direction of the thermoplastic resin film is 10 µm or less.

[7] The thermoplastic resin film according to any one of [1] to [6], wherein a tensile elastic modulus of the resin composite is $1.0 \times 10^4$ Pa or more at 260° C.

[3] The thermoplastic resin film according to any one of [1] to [7], wherein a transmittance of UV light of the resin composite at a wavelength of 375 nm is more than 0.50%.

[9] The thermoplastic resin film according to any one of [1] to [3], wherein a maximum rate of dimensional change in the in-plane direction of the resin composite is 2.0% or less at 260° C.

According to an aspect of the thermoplastic resin film of the present disclosure, the thermoplastic resin film is a resin composite of a first sin component which is a crystalline thermoplastic resin having a melting point of 290° C. or higher and a second resin component which has a glass transition temperature of 150° C. or higher, wherein the crystallinity of the crystalline thermoplastic resin is more than 5.0% of the entire resin composite, thereby providing heat resistance and excellent elongation characteristics under tension, permeability to UV light, scratch resistance and resistance to deformation in heating. Therefore, the thermoplastic resin film of the present disclosure can be used as a base film for an adhesive tape used in a process of manufacturing semiconductors that can be used in a plurality of processes including a reflow process.

According to the aspect of the thermoplastic resin film of the present disclosure, the first resin component comprises at least one resin selected from the group consisting of a polyether ether ketone, a polyether ketone, a polyether ketone ketone, a polyether ether ketone ketone and an aliphatic polyketone, thereby reliably improving heat resistance and elongation characteristics under tension.

According to the aspect of the thermoplastic resin film of the present disclosure, the second resin component comprises an aromatic polyester resin or an amorphous thermoplastic resin having an ether bond, thereby reliably improving the elongation characteristics under tension.

According to the aspect of the thermoplastic resin film of the present disclosure, the resin composite is composed of a matrix part containing the first resin component and a domain part containing the second resin component dispersedly contained in the matrix part, thereby further improving the elongation characteristics under tension, permeability to UV light, scratch resistance, and resistance to deformation in heating.

According to the aspect of the thermoplastic resin film of the present disclosure, the average diameter of the domain pant in the cut surface in the direction orthogonal to the flow direction of the thermoplastic resin film is 10 µm or less, thereby reliably improving the elongation characteristics under tension and resistance to deformation in heating.

DETAILED DESCRIPTION

The thermoplastic resin film of the present disclosure is a resin composite of a first resin component which is a crystalline thermoplastic resin having a melting point of 290° C. or higher and a second resin component which has a glass transition temperature of 150° C. or higher. Therefore, the thermoplastic resin film of the present disclosure is a resin composite that is alloyed by using the first resin component and the second resin component in combination. In addition, the crystallinity of the first resin component is more than 5.0% of the entire alloyed resin composite.

The first resin component mainly imparts heat resistance to the thermoplastic resin film of the present disclosure. As the first resin component, the resin type is not particularly limited as long as it is a crystalline thermoplastic resin having a melting point of 290° C. or higher, and examples of the first resin component include polyarylene ether ketone (PAEK) resins such as polyether ketones, polyether ether ketones (PEEK), polyether ketone ketones, and polyether ether ketone ketones, and aliphatic polyketone resins. These resins may be used alone or in combination of two or more. Among them, a polyarylene ether ketone (PAEK) resin is preferable, and a polyether ether ketone (PEEK) resin is particularly preferable, from the viewpoint of excellence not only in heat resistance but also in elongation characteristics under tension as a tape for processes of manufacturing semiconductors.

The melting point of the first resin component is not particularly limited as long as it is 290° C. or higher, but the lower limit is preferably 300° C., and particularly preferably 320° C., from the viewpoint that it can be reliably continuously used in the reflow process at about 260° C. On the other hand, the upper limit of the melting point of the first resin component is, for example, 340° C.

The crystallinity of the first resin component is not particularly limited as long as it is more than 5.0% of the entire resin composite, but the lower limit is preferably 7%, and particularly preferably 9% from the viewpoint of that the heat resistance of the thermoplastic resin film is reliably improved and its resistance to deformation is reliably obtained even under thermal loading. On the other hand, the upper limit of the crystallinity of the first resin component is preferably 30% and particularly preferably 25% of the entire resin composite from the viewpoint of reliably preventing the embrittlement of the thermoplastic resin film and ensuring a better permeability to UV light. The crystallinity of the first resin component can be calculated from the area ratio between the amorphous halo and the diffraction peak of the crystal obtained by wide-angle X-ray diffraction.

The second resin component mainly provides the thermoplastic resin film of the present disclosure with permeability to UV light and resistance to deformation in heating. The second resin component may be a crystalline thermoplastic resin or an amorphous thermoplastic resin. As the second resin component, the resin type is not particularly limited as long as the second resin component is a resin having a glass transition temperature (Tg) of 150° C. or more, and examples include polyetherimide, polyamideimide, polyethersulfone, polysulfone, polyarylate, polyphenylene ether, and aromatic polyester. These may be used alone or in combination of two or more. Among them, amorphous thermoplastic resins having an ether bond, polyarylate, and aromatic polyesters are preferable from the viewpoint that permeability to UV light and resistance to deformation in heating as the tape for the process of manufacturing semiconductors are improved in a well-balanced manner. Polyethersulfone is particularly preferable as the amorphous thermoplastic resin having an ether bond.

The glass transition temperature of the second resin component is not particularly limited as long as it is 150° C. or higher, but the lower limit of the temperature is preferably 170° C., and particularly preferably 180° C. from the viewpoint of further improvement of the elongation characteristics under tension and the resistance to deformation in heating to be achieved by preventing the second resin component from softening when the first resin component crystallizes. On the other hand, the upper limit of the glass transition temperature of the second resin component is, for example, 260° C.

The compounding ratio of the first resin component and the second resin component is not particularly limited, but the second resin component is preferably contained at a ratio of 20 parts by mass or more and 160 parts by mass or less, more preferably 30 parts by mass or more and 120 parts by mass or less, and particularly preferably 40 parts by mass or more and 100 parts by mass or less per 100 parts by mass of the first resin component, from the viewpoint of improving heat resistance, elongation characteristics under tension, permeability to UV light, scratch resistance, and resistance to deformation in heating, in a balanced manner.

The alloyed resin composite includes those having a structure composed of a matrix part comprising the first resin component and a domain part comprising the second resin component dispersedly contained in the matrix part. That is, the resin composite includes those having a sea-island structure composed of a sea phase of the first resin component and a plurality of island phases of the second resin component. The alloyed resin composite of the present disclosure has a phase separation structure in which the matrix part and the domain part are highly separable. A large number of independent island phases of the second resin component are dispersed in the sea phase of the first resin component, resulting in a particularly well-balanced improvement in permeability to UV light and resistance to deformation in heating as well as elongation characteristics under tension and scratch resistance as a tape for the process of manufacturing semiconductors.

Among these, a structure composed of a matrix part containing the first resin component as a main component and a domain part containing the second resin component dispersedly contained in the matrix part as a main component is preferable, A structure composed of a matrix part composed of the first resin component and a domain part composed of the second resin component dispersedly contained in the matrix part is particularly preferable.

The average diameter of the domain part in the cut surface orthogonal to the flow direction of the thermoplastic resin film is not particularly limited, but is preferably 10 µm or less, and particularly preferably 5.0 µm less from the viewpoint that elongation characteristics under tension, permeability to UV light, scratch resistance and resistance to deformation in heating as a tape for processes of manufacturing semiconductors are improved in a particularly balanced manner due to the excellent dispersibility of the domain part. The lower the lower limit of the above average diameter of the domain part is, the more preferable it is, and an exemplary lower limit of 0.5 µm can be mentioned.

The sea-island structure consisting of the sea phase of the first resin component and the island phase of the second resin component can be confirmed by observing with a scanning electron microscope (SEM), etc., and the above average diameter of the domain part is determined in accordance with ASTM D3576-77.

The thickness of the thermoplastic resin film is not particularly limited, but the lower limit of the thickness is preferably 10 µm, and particularly preferably 25 µm from the viewpoint of protecting the semiconductor wafer more reliably through the reflow process and processes other than the reflow process such as the back grinding process, the dicing process and the pickup process. On the other hand, the upper limit of the thickness of the thermoplastic resin film is preferably 200 µm, and particularly preferably 100 µm from the viewpoint of facilitating the expanding process to reliably pick up the semiconductor chip.

The method for producing the thermoplastic resin film is not particularly limited, and a known film forming method can be used. For example, it can be manufactured by a method comprising mixing the first resin component and the second resin component at a predetermined ratio and then extrusion-molding with an extruder. After forming a film shape, an annealing treatment may be performed.

The above-mentioned thermoplastic resin film of the present disclosure has an excellent tensile elastic modulus at 260° C. as a tape for a process of manufacturing semiconductors. For example, in the thermoplastic resin film of the present disclosure, the higher the tensile elastic modulus of the resin composite at 260° C. is, the more desirable it is, from the viewpoint of suppressing the occurrence of elongation of the thermoplastic resin film in the reflow process to reliably maintain the positional accuracy of the workpiece. For example, the lower limit is preferably $1.0 \times 10^4$ Pa, more preferably $1.0 \times 10^6$ Pa, and particularly preferably $1.0 \times 10^7$ Pa. On the other hand, the upper limit of the tensile elastic modulus of the resin composite at 260° C. is, for example, $2.0 \times 10^9$ Pa. The tensile elastic modulus is the tensile elastic modulus measured in accordance with JIS K7127.

The above-mentioned thermoplastic resin film of the present disclosure is excellent in UV transmission as a tape for a process of manufacturing semiconductors. For example, in the thermoplastic resin film of the present disclosure, the transmittance of UV light at a wavelength of 375 nm is preferably more than 0.50%, more preferably 1.0% or more, and particularly preferably 2.0% or more from the viewpoint of facilitating pickup of a semiconductor chip.

In the above-mentioned thermoplastic resin film of the present disclosure, the maximum rate of dimensional change in the in-plane direction at 260° C. is excellent as a tape for a process of manufacturing semiconductors. That is, the thermoplastic resin film of the present disclosure is excellent in resistance to deformation at 260° C. For example, in the thermoplastic resin film of the present disclosure, the maximum rate of dimensional change in the in-plane direction at 260° C. is preferably 2.0% or less and particularly preferably 1.0% or less from the viewpoint of reliably preventing the workpiece from falling off the tape for the process of manufacturing semiconductors during the reflow process.

Therefore, in the thermoplastic resin film of the present disclosure, the rate of dimensional change in the flow direction and the rate of dimensional change in the direction orthogonal to the flow direction of the thermoplastic resin film are both reduced, preferably to 2.0% or less, and particularly preferably to 1.0% or less.

In addition, the above-mentioned thermoplastic resin film of the present disclosure is excellent in tensile elongation at break as a tape for processes of manufacturing semiconductors. For example, in the thermoplastic resin film of the present disclosure, the lower limit of the tensile elongation at break is preferably 50%, more preferably 75%, and particularly preferably 100% from the viewpoint of facilitating the expansion at the time of picking up a semiconductor chip. The tensile elongation at break is the tensile elongation at break measured in accordance with JIS K6251.

In the above-mentioned thermoplastic resin film of the present disclosure, the range of the elastic deformation region is excellent as a tape for a process of manufacturing semiconductors. For example, in the thermoplastic resin film of the present disclosure, 4.0% or more is preferable, and 5.0% or more is particularly preferable, from the viewpoint of facilitating the expansion at the time of picking up a semiconductor chip. The range of the elastic deformation region was the region up to the yield point.

In addition, the above-mentioned thermoplastic resin film of the present disclosure is excellent as a tape for a process of manufacturing semiconductors because it has scratch resistance and can be used in a dicing process.

EMBODIMENTS

Hereinafter examples of the present disclosure will be described, but the present disclosure is not limited to the aspects of the following Examples.

Example 1

A thermoplastic resin film was produced by extrusion-molding using 60% by mass of a polyether ether ketone (PEEK, melting point of 334° C.) as the first resin component and 40% by mass of polyarylate (glass transition temperature of 195° C.) as the second resin component. The obtained thermoplastic resin film was subjected to crystallization treatment in a float film annealing furnace. The thermoplastic resin film after the crystallization treatment was confirmed to have a sea-island structure by structural observation with SEM and the average diameter of the dispersed phase was 0.5 to 1.0 μm. The conditions for crystallization treatment n the float film annealing furnace were as follows.

Heating temperature: 220° C.
Furnace tension: 1 N (300 mm wide film)
Linear velocity: The speed at which the crystallization peak can no longer be confirmed by differential scanning calorimetry (DSC)

Example 2

A thermoplastic resin film was produced in a similar manner to that in Example 1 except that polyethersulfone (glass transition temperature of above 200° C.) was used as the second resin component. The obtained thermoplastic resin films were confirmed to have a sea-island structure, and the average diameter of the dispersed phase was 1.0 to 10 μm.

Example 3

A thermoplastic resin film was produced in a similar manner to that in Example 1 except that 40% by mass of the polyether ether ketone (PEEK) was used as the first resin component and 60% by mass of polyarylate (glass transition temperature of 195° C.) was used as the second resin component. The obtained thermoplastic resin films were confirmed to have a sea-island structure, and the average diameter of the dispersed phase was 1.0 to 10 μm.

In Comparative Example 1, a resin film was produced in a similar manner to that in Example 1 using only polyimide resin (PI).

In Comparative Example 2, a resin film was produced in a similar manner to that in Example 1 using only polyolefin resin (PO).

In Comparative Example 3, a resin film was produced in a similar manner to that in Example 1 using only polyethylene terephthalate (PET).

In Comparative Example 4, a resin film was produced in a similar manner to that in Example 1 using only polyethylene naphthalate (PEN).

In Comparative Example 5, Sepla crystallization grade (50 μm), which is a commercially available crystallized film made of the polyether ether ketone, was used.

In Comparative Example 6, 10 parts by mass of talc was added to 90 parts by mass of polyethylene naphthalate (PEN), and a resin film was produced in a similar manner to that in Example 1.

In Comparative Example 7, 40 parts by mass of polycarbonate (PC) was added to 60 parts by mass of the polyether ether ketone (PEEK), and a resin film was produced in a similar manner to that in Example 1. Crystallization treatment was carried out like in Example 1.

In Comparative Example 8, a resin film was produced in a similar manner to that in Example 1 using only the polyether ether ketone (PEEK).

The evaluation items and methods are as follows.

(1) Crystallinity of the First Resin Component in Thermoplastic Resin Film (%)

For each resin film, the crystallinity was determined by wide-angle X-ray diffraction. A two-dimensional measuring instrument was used to set a diffraction pattern of 15 to 27 degrees as an analytical range, and the crystallinity was determined from the ratio of the amorphous halo to the diffraction peaks of the crystal.

(2) Rate of Dimensional Change at 260° C. (Resistance to Deformation at 260° C.) (%)

Each resin film was stored in a thermostatic chamber at 260° C. for 10 minutes, and the rate of dimensional change of each resin film before and after storage was determined in the longitudinal direction (MD direction) and the direction orthogonal to the longitudinal direction (TD direction).

(3) Tensile Elastic Modulus at 260° C. (Pa)

For each resin film, tensile elastic modulus at 260° C. was measured in a tensile mode of DMA 850 manufactured by TA Instruments. This measurement method is in accordance with JIS K7127.

(4) UV Transmission at 375 nm (%)

For each resin film, the molded product was measured for light transmittance at a light wavelength of 375 nm under the condition of a spectral slit (4 nm) with a spectrophotometer (U-4100 (manufactured by Hitachi High Technologies Corporation)).

(5) Elastic Deformation Region (%)

Each resin film was subjected to a tensile test using an autograph "AG-Xplus" manufactured by Shimadzu Corporation, and the area up to the yield point was measured as the elastic deformation region.

(6) Tensile Elongation at Break (%)

For each resin film, tensile elongation at break was measured in accordance with JIS K6251, (7) Scratch Resistance Each resin film was subjected to the dicing process of the process of manufacturing semiconductors and evaluated according to the following criteria.

○: No blade scrap
x: Blade scraps or film breakage

The evaluation results are shown in Table 1 below.

TABLE 1

|  | Example 1 | Example 2 | Example 3 | Comparative Example 1 | Comparative Example 2 | Comparative Example 3 |
|---|---|---|---|---|---|---|
| First resin component | PEEK 60% by mass | PEEK 60% by mass | PEEK 40% by mass | PI | PO | PET |
| First resin component melting point (° C.) | 340 | 340 | 340 | — | 130 | 240 |
| Second resin component | Polyarylate 40% by mass | Polyethersulfone 40% by mass | Polyarylate 60% by mass | — | — | — |

TABLE 1-continued

|  | | | | | | |
|---|---|---|---|---|---|---|
| Second resin component Tg (° C.) | 190 | 200 | 200 | — | — | — |
| Crystallinity of the first resin component in thermoplastic resin film (%) | 15 | 14 | 3 | — | — | — |
| Rate of dimensional change at 260° C. (%) | MD: −0.2 TD: −0 1 | MD: −0.2 TD: −0.1 | MD: −0.3 TD: −0.2 | MD: −0.4 TD: −0.4 | ND | ND |
| Tensile elastic modulus at 260° C. (Pa) | 1.00E+08 | 1.50E+08 | 1.00E+08 | 1.00E+09 | ND | ND |
| UV transmission at 375 nm (%) | 4.5 | 3.0 | 6.0 | 0 | 30 | 20 |
| Elastic deformation region (%) | 5 | 5 | 5 | 3 | 8 | 6 |
| Tensile elongation at break (%) | 150 | 150 | 12 | 8 | 200 | 150 |
| Scratch resistance | ○ | ○ | ○ | x (breakage) | ○ | x (Blade scraps) |

|  | Comparative Example 4 | Comparative Example 5 | Comparative Example 6 | Comparative Example 7 | Comparative Example 8 |
|---|---|---|---|---|---|
| First resin component | PEN | PEEK | PEN 90% by mass | PEEK 60% by mass | PEEK |
| First resin component melting point (° C.) | 270 | 340 | 270 | 340 | 340 |
| Second resin component | — | — | Talc 10% by mass | PC 40% by mass | — |
| Second resin component Tg (° C.) | — | — | — | 145 | — |
| Crystallinity of the first resin component in thermoplastic resin film (%) | — | 33 | — | — | — |
| Rate of dimensional change at 260° C. (%) | ND | MD −6.5 TD −0.5 | ND | ND ND | ND ND |
| Tensile elastic modulus at 260° C. (Pa) | ND | 1.00E+09 | ND | ND | ND |
| UV transmission at 375 nm (%) | 3 | 0 | 0 | ND | ND |
| Elastic deformation region (%) | 6 | 5 | 5 | ND | ND |
| Tensile elongation at break (%) | 140 | 150 | 80 | ND | ND |
| Scratch resistance | x (Blade scraps) | ○ | x (Blade scraps) | ND | ND |

From Table 1 above, it was found that in Examples 1 to 3 in which a resin composite of the first resin component, which is a crystalline thermoplastic resin having a melting point of 290° C. or higher, and the second resin component having a glass transition temperature of 150° C. or higher was obtained, the crystallinity of the first resin component is more than 5.0% of the entire resin composite, the rate of dimensional change at 260° C. is reduced and the tensile elastic modulus at 260° C. is $1.00 \times 10^8$ Pa to $1.50 \times 10^8$ Pa, thus the resin composite can be suitably used in the reflow process. In addition, in Examples 1 to 3, the 375 nm UV transmission was 3.0% to 6.0%, which was excellent in terms of UV transmission, and thus it was found that the resin composite can be suitably used in the semiconductor chip pickup process. In addition, in Examples 1 and 2, it was found that the elastic deformation region could be maintained at 5% and the tensile elongation at break could be maintained at 150%, thus it was possible to sufficiently cope with the expanding process of the tape for the process of manufacturing semiconductors at the time of picking up the semiconductor chip. In Example 3, it was found that the elastic deformation region could be maintained at 5%, thus it was possible to cope with the expanding process. Furthermore, in Examples 1 to 3, it was found that the resin composite can be suitably used in the process of dicing a semiconductor wafer because it has excellent scratch resistance.

On the other hand, in Comparative Example 1 in which only the polyimide resin was used, it was found that 375 nm UV transmission and scratch resistance were not obtained, the elastic deformation region and the tensile elongation at break were not improved, thus it could not be used in processes other than the reflow process. In Comparative Example 2 in which only the polyolefin resin was used, it was found that the rate of dimensional change at 260° C. was large and the tensile elastic modulus at 260° C. was low, thus it could not be used in the reflow process. Furthermore, in Comparative Example 3 in which only polyethylene terephthalate was used, it was found that scratch resistance was not obtained, thus it could not be used in the dicing process. In addition, in Comparative Example 4 in which only polyethylene naphthalate was used, it was found that the film shrinkage occurred in an environment of 260° C. because it is too close to the melting point, thus the rate of dimensional change at 260° C. could not be measured, and the tensile elastic modulus at 260° C. could not be measured because the film softening proceeded excessively, making it impossible to be used in the reflow process. In addition, in Comparative Example 4, it was found that scratch resistance was not obtained, thus it could not be used in the dicing process. Furthermore, in Comparative Example 5, the resistance to deformation in the MD direction at 260° C. and 375 nm UV transmission were not obtained.

In addition, in Comparative Example 6, in which talc was added to polyethylene naphthalate, which has a melting point of 270° C., again, the film shrinkage occurred at 260° C. because the temperature is too close to the melting point, and the rate of dimensional change could not be measured. Similarly, the elastic modulus could not be measured because the film softening proceeded excessively.

Thereafter, in Comparative Example 7, in which 40 parts by mass of polycarbonate (PC) was added to 60 parts by mass of the polyether ether ketone (PEEK), a formed film was subjected to crystallization treatment, the resin film could not withstand the tension of the annealing furnace and was stretched/broken, thus the crystallized film could not be collected.

Thereafter, in Comparative example 8, in which a film of the polyether ether ketone (PEEK) was formed in a similar manner to that in Example 1, the film was subjected to crystallization treatment, the resin film could not withstand the tension of the annealing furnace and stretched/broken, thus the crystallized film could not be collected.

What is claimed is:

1. A thermoplastic resin film, which is a resin composite of a first resin component, that is a crystalline thermoplastic resin having a melting point of 290° C. or higher and a second resin component that has a glass transition temperature of 150° C. or higher, wherein the crystallinity of the first resin component in the resin composite is more than 5.0% and less than 30.0%, wherein the crystallinity of the first resin component is determined from a ratio of an amorphous halo to diffraction peaks of a crystal.

2. The thermoplastic resin film according to claim 1, wherein the first resin component comprises at least one resin selected from the group consisting of a polyether ether ketone, a polyether ketone, a polyether ketone ketone, a polyether ether ketone ketone and an aliphatic polyketone.

3. The thermoplastic resin film according to claim 1, wherein the second resin component comprises an aromatic polyester resin.

4. The thermoplastic resin film according to claim 2, wherein the second resin component comprises an aromatic polyester resin.

5. The thermoplastic resin film according to claim 1, wherein the second resin component comprises an amorphous thermoplastic resin having an ether bond.

6. The thermoplastic resin film according to claim 2, wherein the second resin component comprises an amorphous thermoplastic resin having an ether bond.

7. The thermoplastic resin film according to claim 1, wherein the resin composite is composed of a matrix part comprising the first resin component and a domain part comprising the second resin component dispersedly contained in the matrix part.

8. The thermoplastic resin film according to claim 2, wherein the resin composite is composed of a matrix part comprising the first resin component and a domain part comprising the second resin component dispersedly contained in the matrix part.

9. The thermoplastic resin film according to claim 3, wherein the resin composite is composed of a matrix part comprising the first resin component and a domain part comprising the second resin component dispersedly contained in the matrix part.

10. The thermoplastic resin film according to claim 5, wherein the resin composite is composed of a matrix part comprising the first resin component and a domain part comprising the second resin component dispersedly contained in the matrix part.

11. The thermoplastic resin film according to claim 7, wherein an average diameter of the domain part in a cut surface in a direction orthogonal to a flow direction of the thermoplastic resin film is 10 μm or less.

12. The thermoplastic resin film according to claim 1, wherein a tensile elastic modulus of the resin composite is $1.0 \times 10^4$ Pa or more at 260° C.

13. The thermoplastic resin film according to claim 1, wherein a transmittance of UV light of the resin composite at a wavelength of 375 nm is more than 0.50%.

14. The thermoplastic resin film according to claim 1, wherein a maximum rate of dimensional change in the in-plane direction of the resin composite is 2.0% or less at 260° C. for 10 minutes.

* * * * *